US012600185B2

(12) United States Patent     (10) Patent No.:  US 12,600,185 B2
     Brunson                      (45) Date of Patent:      Apr. 14, 2026

(54) MULTI-LAYERED GREASE POD FOR BALL AND FIFTH WHEEL HITCHES

(71) Applicant: Brian Brunson, Moore, OK (US)

(72) Inventor:  Brian Brunson, Moore, OK (US)

( * ) Notice:   Subject to any disclaimer, the term of this patent is extended or adjusted under 35 U.S.C. 154(b) by 0 days.

(21) Appl. No.: 19/069,301

(22) Filed:     Mar. 4, 2025

(65)            Prior Publication Data

US 2025/0326260 A1      Oct. 23, 2025

Related U.S. Application Data

(60) Provisional application No. 63/634,991, filed on Apr. 17, 2024.

(51) Int. Cl.
     *B60D 1/58*       (2006.01)
     *F16N 11/00*      (2006.01)
     *B62D 53/08*      (2006.01)
     *C10M 125/02*     (2006.01)
     *C10M 125/04*     (2006.01)
     *C10N 50/10*      (2006.01)

(52) U.S. Cl.
     CPC .............. *B60D 1/586* (2013.01); *F16N 11/00* (2013.01); *B62D 53/08* (2013.01); *C10M 125/02* (2013.01); *C10M 125/04* (2013.01); *C10M 2201/041* (2013.01); *C10M 2201/05* (2013.01); *C10M 2203/003* (2013.01); *C10N 2050/10* (2013.01)

(58) Field of Classification Search
     CPC ................................ B60D 1/586; F16N 11/00
     See application file for complete search history.

(56)            References Cited

U.S. PATENT DOCUMENTS

| | | | |
|---|---|---|---|
| 2,506,204 | A | 5/1950 | Freestone |
| 2,889,922 | A * | 6/1959 | Clarvoe .................. E04D 5/148 |
| | | | 206/820 |
| 3,469,655 | A * | 9/1969 | Moreno .............. F16C 33/6622 |
| | | | 184/105.1 |
| 4,913,263 | A * | 4/1990 | Spiers ..................... F16N 11/00 |
| | | | 280/433 |
| 5,271,528 | A | 12/1993 | Chien |
| 5,662,156 | A * | 9/1997 | Freeman ............ B22D 17/2007 |
| | | | 164/113 |
| 8,079,449 | B2 * | 12/2011 | Beylerian ............. F16D 65/092 |
| | | | 188/250 R |
| 10,900,394 | B2 | 1/2021 | Edwards |

(Continued)

*Primary Examiner* — Minh Truong
(74) *Attorney, Agent, or Firm* — Brennan, Manna & Diamond, LLC

(57)            ABSTRACT

The present invention is a grease pod to simplify and enhance the application of grease to ball hitches used in towing trailers and fifth wheel hitches. The grease pod includes a multi-layered body adapted to fit snugly over the hitch. The pod includes an inner layer and an outer layer, both made from a film, heat-sealed together to form a secure and pressure sensitive enclosure. A premeasured quantity of grease is included in the enclosure and can be available in various formulations such as marine grade grease, lithium, and graphite powder. Upon applying pressure when the trailer coupler or fifth wheel coupling is engaged, the grease pod bursts and releases the grease to evenly coat and lubricate the hitch. The method of use involves placing the pod on the ball hitch and lowering the trailer coupler or engaging the fifth wheel to apply pressure, ensuring precise lubrication.

13 Claims, 5 Drawing Sheets

(56) References Cited

U.S. PATENT DOCUMENTS

| | | | |
|---|---|---|---|
| 11,008,530 B2 * | 5/2021 | Whiting | C10M 169/04 |
| 11,186,328 B2 * | 11/2021 | Jenssen | B62D 53/0885 |
| 2006/0210409 A1 | 9/2006 | Sumner | |
| 2018/0112565 A1 | 4/2018 | Edwards | |
| 2020/0086704 A1 * | 3/2020 | Czemske | B60D 1/586 |
| 2022/0324524 A1 * | 10/2022 | Anderson | F16N 3/00 |
| 2022/0388357 A1 * | 12/2022 | Scharmüller | B60D 1/586 |

* cited by examiner

302

100

202

MULTI-LAYERED GREASE POD FOR BALL AND FIFTH WHEEL HITCHES

CROSS-REFERENCE TO RELATED APPLICATION

The present application claims priority to, and the benefit of, U.S. Provisional Application No. 63/634,991, which was filed on Apr. 17, 2024, and is incorporated herein by reference in its entirety.

FIELD OF THE INVENTION

The present invention generally relates to the field of lubrication solutions for towing equipment. More specifically, the present invention relates to a novel ball hitch grease pod designed to simplify and enhance the process of applying grease to ball hitches used in towing trailers and fifth wheel hitches. The grease pod comprises a multi-layered body, for example a water-soluble body, that includes an inner layer and an outer layer, both made from a film to enclose a premeasured quantity of grease. Upon applying pressure when the trailer or fifth wheel coupling is engaged, the pod bursts, releasing the grease to evenly coat and lubricate the hitch, ensuring precise and clean lubrication. Accordingly, the present disclosure makes specific reference thereto. Nonetheless, it is to be appreciated that aspects of the present invention are also equally applicable to other like applications, devices, and methods of manufacture.

BACKGROUND

By way of background, when towing a trailer, greasing a hitch such as ball hitch or fifth wheel hitch is necessary and involves applying a lubricant to the metal ball that connects the trailer to the towing vehicle. This lubrication process is essential as it reduces friction, noise, and wear and tear on both the ball and the trailer's tongue or coupler. Additionally, greasing a ball hitch helps protect the ball from rust and corrosion, which can otherwise weaken the connection and pose significant safety risks.

The conventional process of applying grease to a ball hitch can be messy, frustrating, and time-consuming. Traditional methods of greasing often result in wasted lubricant and may require the person to bend or kneel, which can be physically uncomfortable or impractical, especially in unfavorable weather conditions. The lack of a precise application method can lead to either over-greasing or under-greasing.

If a ball hitch is not properly lubricated, the driver may experience loud squeaking and grinding noises, particularly when turning or reversing the trailer. Such noises can indicate potential damage to the ball and the trailer. The damage caused by inadequate lubrication can lead to costly repairs and pose safety hazards during towing operations. Individuals desire a convenient, precise, and clean solution for applying grease to hitches.

Therefore, there exists a long-felt need in the art for a device that facilitates the clean, precise, and efficient application of grease to hitches used in towing trailers. There is also a long-felt need in the art for a novel grease pod that eliminates the mess, frustration, and time consumption associated with traditional greasing methods. Additionally, there is a long-felt need in the art for an improved device that ensures the proper amount of grease is applied, reducing the risk of over-greasing or under-greasing, which can lead to wear, tear, and noise issues. Moreover, there is a long-felt need in the art for a unique grease pod that provides a more convenient alternative to manual greasing, enabling individuals to apply lubricant without the need to bend or kneel. Further, there is a long-felt need in the art for a grease pod that integrates advanced features such as multi-layered materials, for example water-soluble materials, that provide continuous lubrication and environmental benefits. Furthermore, there is a long-felt need in the art for a grease pod with customizable grease formulations to suit various towing needs and environments. Finally, there is a long-felt need in the art for a grease pod that combines ease of use, precision, and environmental friendliness to provide a comprehensive solution for greasing ball hitches.

The subject matter disclosed and claimed herein, in one embodiment thereof, comprises a system for lubricating a trailer hitch using a hitch grease pod is described. The system comprises a ball hitch grease pod having a multi-layered body configured to fit snugly over a hitch, an inner layer made from a film, an outer layer made from a film heat-sealed to the inner layer forming a secure and pressure sensitive enclosure, and a premeasured quantity of grease encapsulated within the secure enclosure. A trailer is configured to be lowered onto the hitch and the hitch grease pod bursts and releases the grease upon application of pressure when the trailer is lowered onto the ball hitch, providing lubrication to the hitch.

In this manner, the grease pod of the present invention accomplishes all of the foregoing objectives and provides users with a novel pod for the clean, precise, and efficient application of grease to ball hitches and fifth wheel hitches. The grease pod features a multi-layered body designed to fit snugly over the hitch for optimal coverage. The inner layer and the outer layer is heat-sealed to form a secure and pressure sensitive enclosure. The pod includes the premeasured quantity of grease which is released evenly and effectively when pressure is applied, eliminating the guesswork and mess associated with traditional greasing methods. The pod includes various grease formulations such as heavyweight, synthetic, marine grade, lithium, and graphite powder to meet diverse towing needs. Additionally, the grease pod provides continuous lubrication, reducing wear, noise, and corrosion.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a ball hitch grease pod for applying grease to ball hitches. The pod comprises a multi-layered body, for example a water-soluble body, configured to fit snugly over a ball hitch, an inner layer heat scaled to an outer layer along the respective edges forming a secure and pressure sensitive enclosure, a premeasured quantity of grease encapsulated within the secure enclosure between the inner and outer layers, wherein the grease is selected from the group consisting of heavyweight, synthetic, marine grade, lithium, and graphite powder, and wherein the pod is designed to burst and release the grease upon application of pressure when the trailer is lowered onto the ball hitch.

In yet another embodiment, a ball hitch grease pod for applying grease to a fifth wheel hitch is disclosed. The grease pod includes a multi-layered body configured to fit over a fifth wheel hitch, an inner layer heat-sealed to an outer layer along the respective edges forming a secure and pressure sensitive enclosure, a premeasured quantity of grease encapsulated within the secure enclosure between the inner and outer layers, and wherein the pod is designed to burst and release the grease upon application of pressure when the fifth wheel coupling is engaged.

In another embodiment, a system for lubricating a ball hitch using a ball hitch grease pod is described. The system comprises a ball hitch grease pod having a multi-layered body, for example a water-soluble body, in a cup shape configured to fit snugly over a ball hitch, an inner layer made from a film, an outer layer made from a film heat-sealed to the inner layer forming a secure and pressure sensitive enclosure, and a premeasured quantity of grease encapsulated within the secure enclosure. A trailer is configured to be lowered onto the ball hitch and the ball hitch grease pod bursts and releases the grease upon application of pressure when the trailer is lowered onto the ball hitch, providing lubrication to the ball hitch.

In another aspect, a method of lubricating a ball hitch using a ball hitch grease pod is described. The method includes the steps of providing a ball hitch grease pod having a multi-layered body in a cup shape configured to fit snugly over a ball hitch, an inner layer made from a film, an outer layer made from a film heat-sealed to the inner layer forming a secure and pressure sensitive enclosure, and a premeasured quantity of grease encapsulated within the secure enclosure, placing the ball hitch grease pod on the ball hitch, lowering a trailer onto the ball hitch, applying pressure to the ball hitch grease pod, bursting the ball hitch grease pod upon application of pressure, releasing the grease, and distributing the grease over the ball hitch to provide lubrication.

In yet another aspect, the inner layer dissolves more slowly than the outer layer, providing continuous lubrication over time.

In still another embodiment, the grease includes additives that provide improved temperature resistance, water repellency, or load-bearing capacity.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
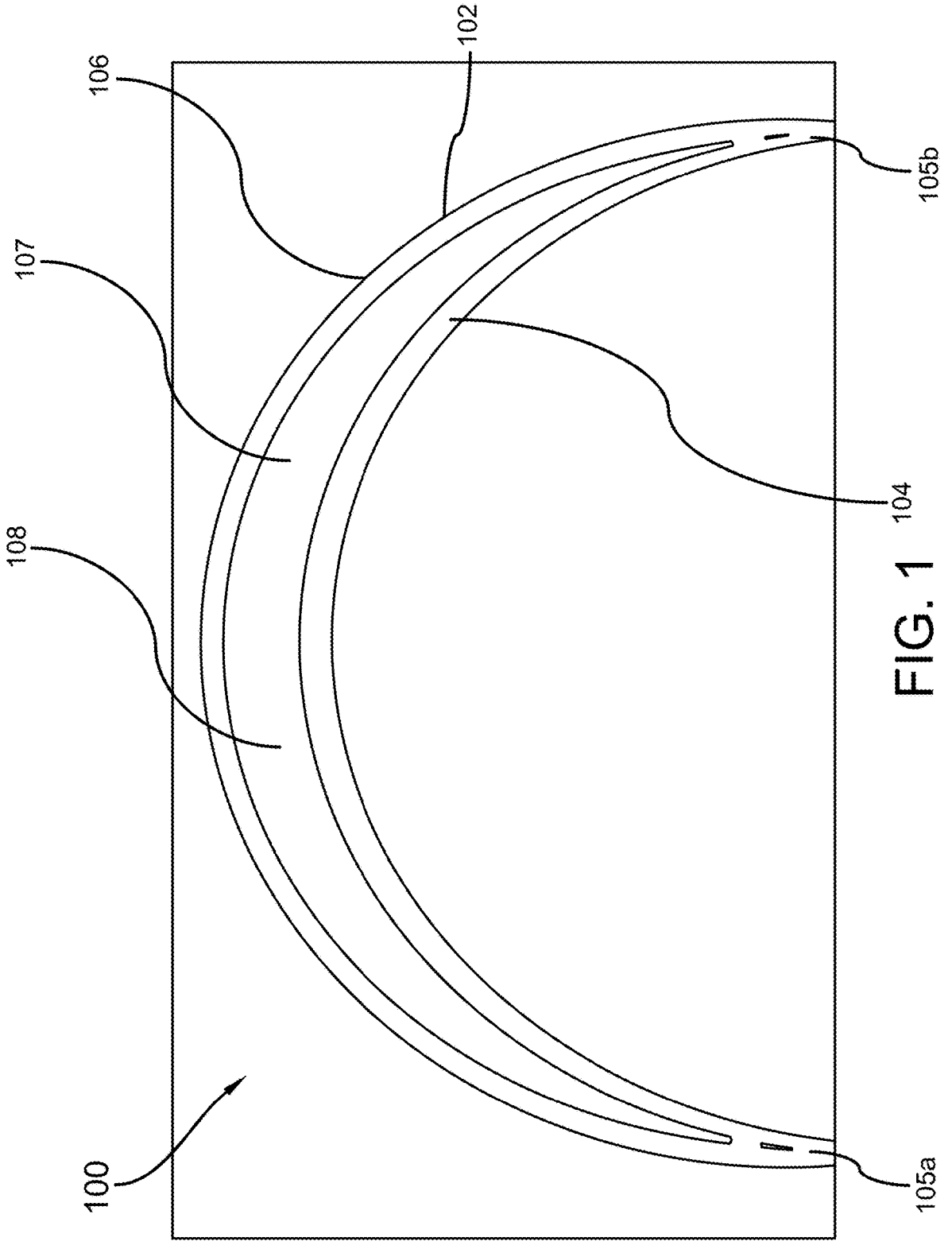
FIG. 1 illustrates a perspective view of ball hitch grease pod of the present invention in accordance with the disclosed structure.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for a device that facilitates the clean, precise, and efficient application of grease to hitches used in towing trailers. There is also a long-felt need in the art for a novel grease pod that eliminates the mess, frustration, and time consumption associated with traditional greasing methods. Additionally, there is a long-felt need in the art for an improved device that ensures the proper amount of grease is applied, reducing the risk of over-greasing or under-greasing, which can lead to wear, tear, and noise issues. Moreover, there is a long-felt need in the art for a unique grease pod that provides a more convenient alternative to manual greasing, enabling individuals to apply lubricant without the need to bend or kneel. Further, there is a long-felt need in the art for a grease pod that integrates advanced features such as multi-layered materials that provide continuous lubrication and environmental benefits. Furthermore, there is a long-felt need in the art for a grease pod with customizable grease formulations to suit various towing needs and environments. Finally, there is a long-felt need in the art for a grease pod that combines ease of use, precision, and environmental friendliness to provide a comprehensive solution for greasing ball hitches.

The present invention, in one exemplary embodiment, is a method of greasing or lubricating a ball hitch using a ball hitch grease pod. The method includes the steps of providing a ball hitch grease pod having a multi-layered body in a cup shape configured to fit snugly over a ball hitch, an inner layer made from a film, an outer layer made from a film heat-sealed to the inner layer forming a secure and pressure sensitive enclosure, and a premeasured quantity of grease or lubricant encapsulated within the secure enclosure, placing the ball hitch grease pod on the ball hitch, lowering a trailer onto the ball hitch, applying pressure to the ball hitch grease pod, bursting the ball hitch grease pod upon application of pressure, releasing the grease, and distributing the grease over the ball hitch to provide lubrication.

Reference will now be made in detail to the present preferred embodiments of the invention, examples of which are illustrated in the accompanying drawings. Wherever possible, the same reference numerals are used in the drawings and the description to refer to the same or like parts.

Referring initially to the drawings, FIG. 1 illustrates a perspective view of ball hitch grease/lubricant pod of the present invention in accordance with the disclosed structure. The ball hitch grease/lubricant pod 100 of the present invention is designed to simplify and enhance the process of applying grease or lubricant to ball hitches used in towing trailers. More specifically, the ball hitch grease pod 100 has a body 102 and is preferably designed in the form of cup-shape to fit snugly over the ball of a hitch. The body 102 is multi-layered and includes an inner layer 104 made from a film, such as polyvinyl alcohol (PVA), which dissolves upon contact with moisture. An outer layer 106 is also made from a film and is heat-scaled to the inner layer 104 along the edges 105a, 105b forming a secure and pressure sensitive enclosure 107 for the grease 108 enclosed therebetween. The sealing of the layers 104, 106 creates a robust barrier, preventing any leakage or contamination of the grease or lubricant 108.

The ball hitch grease pod 100 is formed by a molding process wherein the inner layer 104 may be formed first, using a mold that shapes the film into a cup-like structure. A premeasured quantity of grease is disposed or injected over the inner layer 104. The grease can be one of heavyweight, synthetic, marine grade, lithium, and graphite powder, to meet various towing needs and environments. The layers 104, 106 can have a thickness in the range from about 1 mm to about 3 mm.

Figure 2:
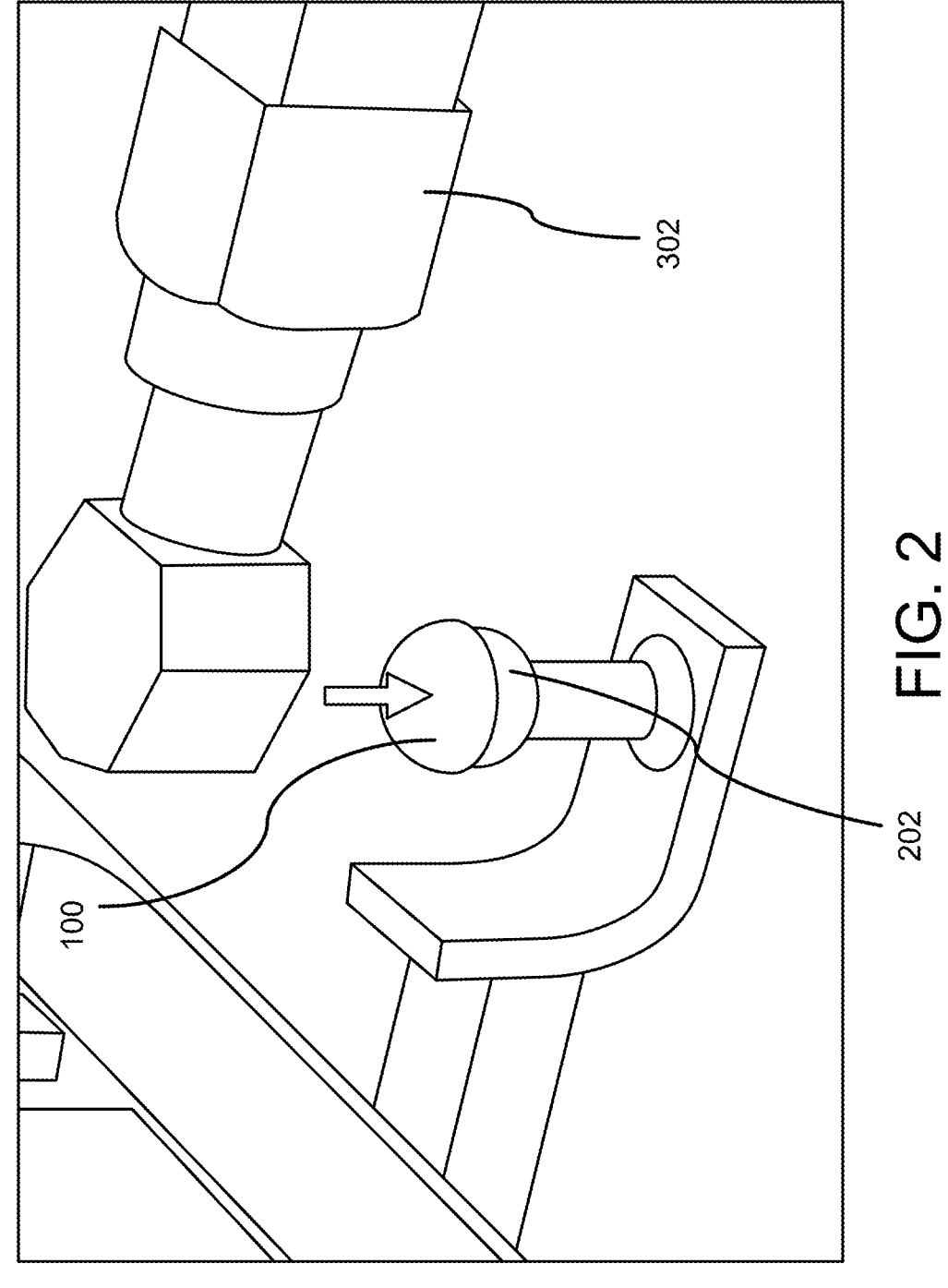
FIG. 2 illustrates a perspective view of the ball hitch grease pod of the present invention applied to a ball hitch in accordance with the disclosed structure.

FIG. 2 illustrates a perspective view of the ball hitch grease pod of the present invention applied to a ball hitch in accordance with the disclosed structure. As illustrated, the pod 100 is directly applied onto the ball hitch 202 and the grease 108 is then later distributed to the ball hitch 202. A premeasured amount of the grease 108 in the pod 100 eliminates the guesswork involved in traditional greasing methods of the ball hitch. In the preferred embodiment, the standard pod 100 includes from about 5 grams of grease to about 50 grams of grease.

Figure 3:
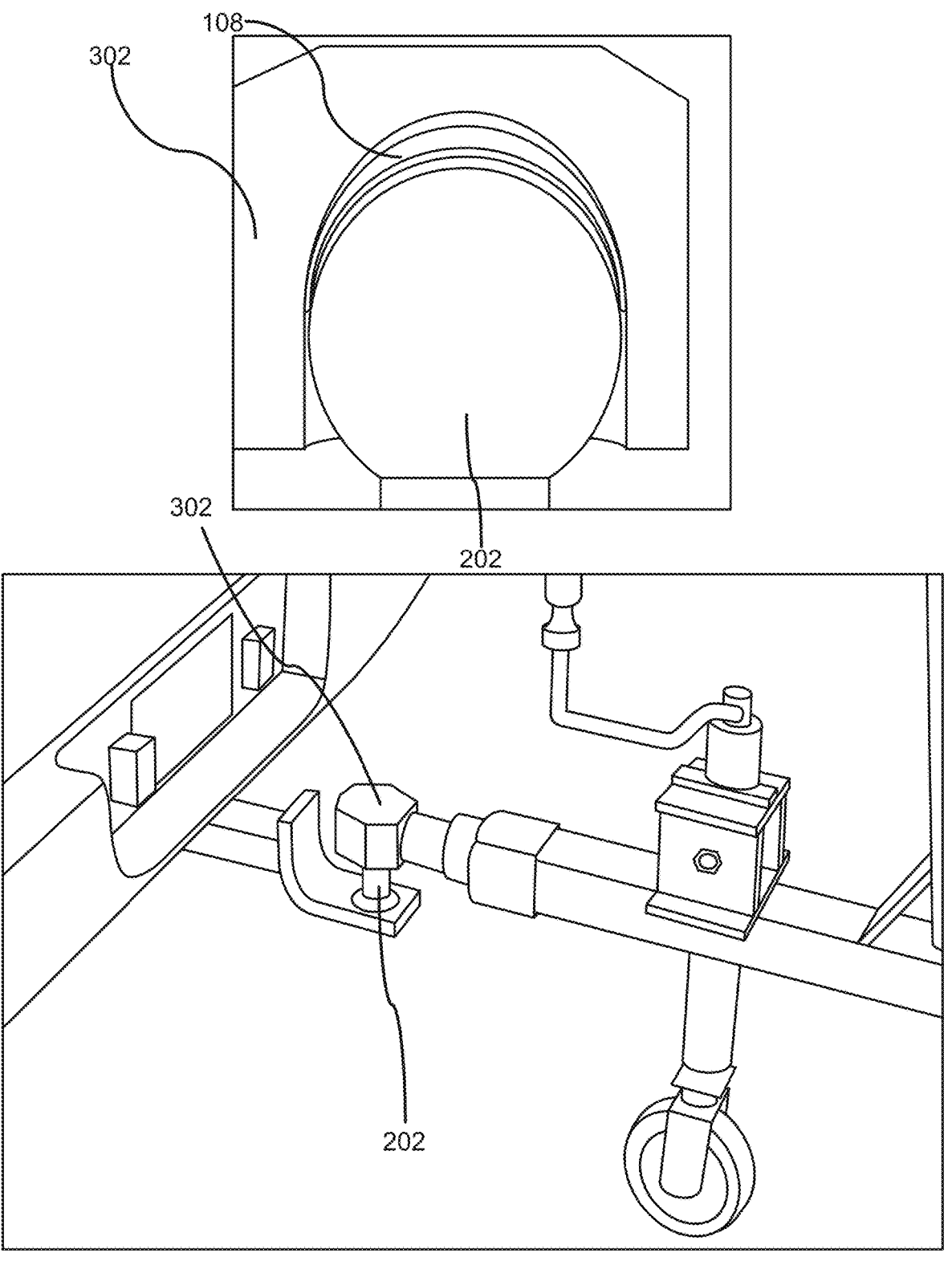
FIG. 3 illustrates a perspective view showing the trailer coupler being lowered onto the pod and ball hitch or trailer coupler to burst the pod to release the grease in accordance with the disclosed structure.

FIG. 3 illustrates a perspective view showing the trailer coupler being lowered onto the pod and ball hitch or trailer coupler to burst the pod to release the grease in accordance with the disclosed structure. When the pod 100 is placed on the ball hitch 202, the trailer coupler 302 is lowered as illustrated in FIGS. 2 and 3, to apply the pressure on the pod 100 to thereafter burst the pod 100. The shape of the pod 100 covers the ball hitch 202 completely to enable the grease 108 to coat the ball hitch 202 completely. The grease 108 is evenly distributed and does not require a user to handle the grease 108 with hands. It will be apparent to a person skilled in the art that both the grease and the films are non-toxic, biodegradable, and minimize environmental impact. The ball hitch grease pod 100 can be designed to fit standard 2-inch and 2⁵⁄₁₆-inch ball hitches.

Figure 4:
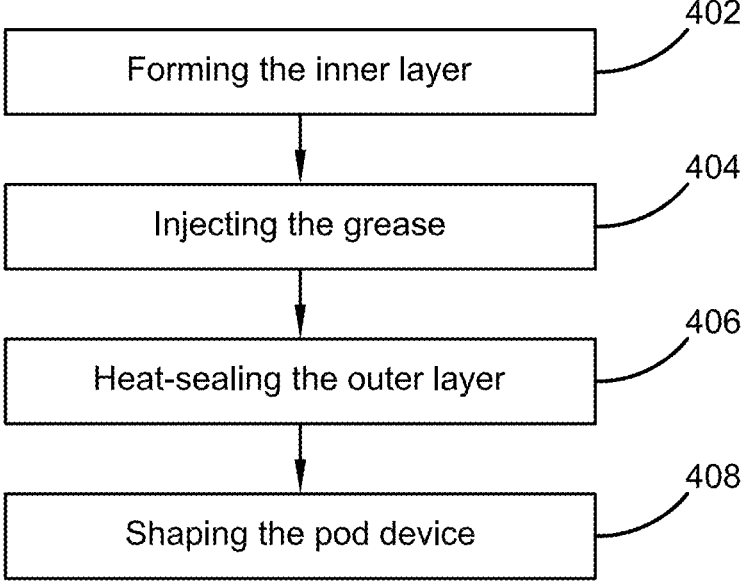
FIG. 4 illustrates a flow chart depicting a process of construction of the premeasured grease pod for efficient ball hitch lubrication of the present invention in accordance with the disclosed structure.

FIG. 4 illustrates a flow chart depicting a process of construction of the premeasured grease pod for efficient ball hitch lubrication of the present invention in accordance with the disclosed structure. Initially, the inner layer 104 is formed, using a mold that shapes the film into a cup-like structure that fits the ball hitch precisely (Step 402). Then, premeasured grease is injected over the inner layer (Step 404). The amount of grease is tailored to the specific type of hitch and the formulation required. Then, the outer layer 106 is placed over the filled inner layer 104 and preferably, the edges of the outer layer are heat-sealed to the inner layer, creating a secure and leak-proof seal (Step 406). Finally, the premeasured grease pod for efficient ball hitch lubrication 100 is processed through a final shaping process to provide and maintain the cup-like form (Step 408).

In one embodiment of the present invention, the outer layer 106 dissolves quickly to release the grease 108 and the inner layer 104 that dissolves more slowly to provide continuous lubrication over time. Further, the grease 108 can include additives that provide improved temperature resistance, water repellency, or load-bearing capacity.

Figure 5:
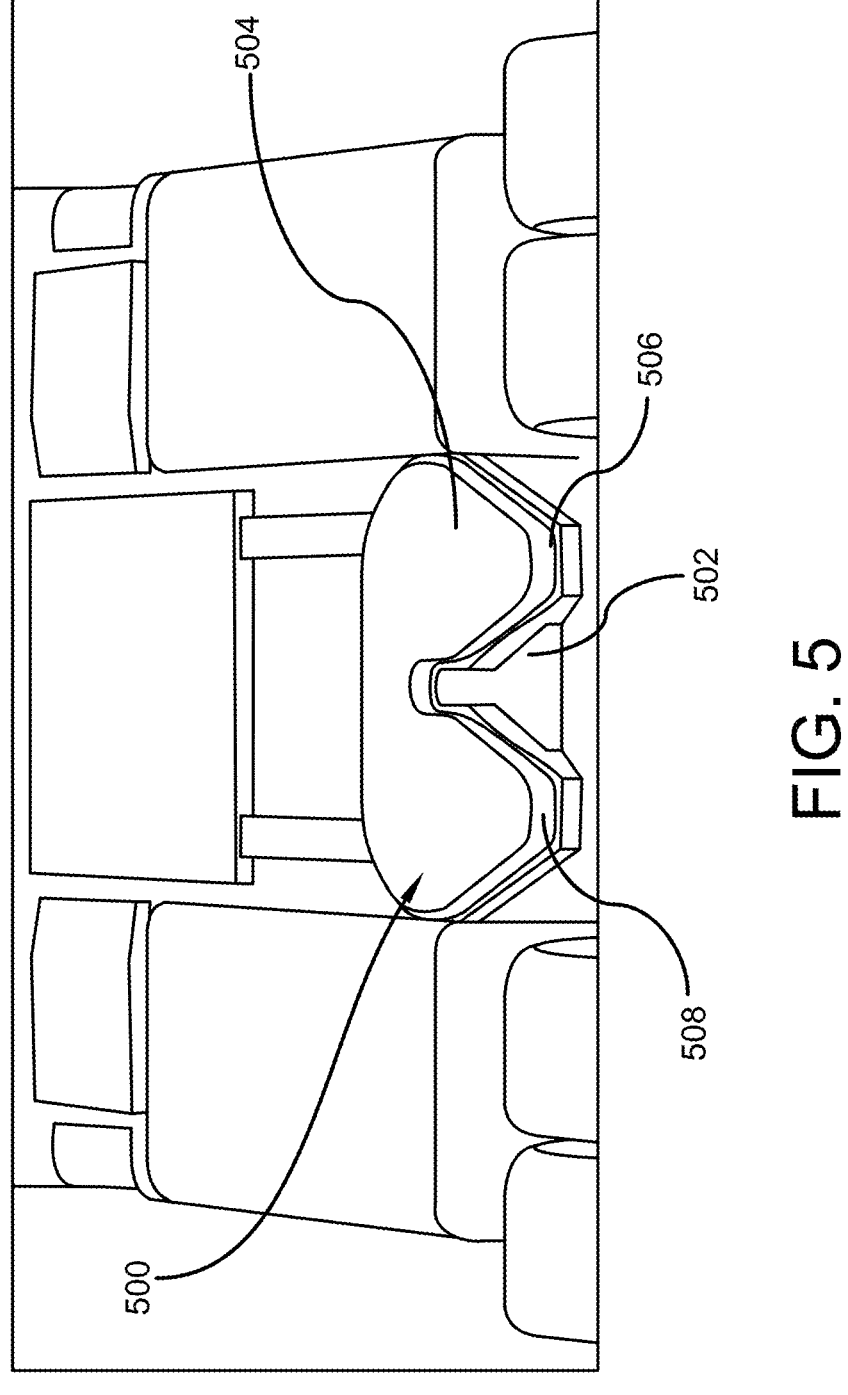
FIG. 5 illustrates a perspective view showing another embodiment of the grease pod designed for 5th wheel hitch in accordance with the disclosed structure.

FIG. 5 illustrates a perspective view showing another embodiment of the grease pod designed for 5th wheel hitch in accordance with the disclosed structure. In the present embodiment, the grease pod 500 is designed to be placed on a 5th wheel hitch 502 for lubricating the hitch. The grease pod 500 includes an outer layer 504 and an inner layer 506 in the form of a pivoting plate head to overlap the 5th wheel hitch 502. The layers 504, 506 are heat-sealed and premeasured grease 508 is enclosed between the layers 504, 506. When the fifth-wheel coupling is done between a semi-trailer and the towing truck, tractor unit, leading trailer, or dolly, the grease pod 500 is pressed and is burst to release the grease to lubricate the fifth wheel hitch 502.

The multi-layered grease pod for ball and fifth wheel hitches 100, 500 of the present invention can be packaged into individual clear plastic bags and the bags are sealed to protect the multi-layered grease pod for ball and fifth wheel hitches 100, 500 from moisture and environmental contaminants. The plastic bag can be made from moisture-resistant polyethylene or a similar material. The plastic bag can also prevent premature dissolution of the layers, ensuring the grease is only released upon application on a hitch and application of the pressure.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "premeasured grease pod for efficient ball hitch lubrication", "multi-layered grease pod for ball and fifth wheel hitches", "ball hitch grease pod", "grease pod", and "pod" are interchangeable and refer to the multi-layered grease pod for ball and fifth wheel hitches 100, 500 of the present invention.

Notwithstanding the forgoing, the multi-layered grease pod for ball and fifth wheel hitches 100, 500 of the present invention can be of any suitable size and configuration as is known in the art without affecting the overall concept of the invention, provided that it accomplishes the above stated objectives. One of ordinary skill in the art will appreciate that the multi-layered grease pod for ball and fifth wheel hitches 100, 500 as shown in the FIGS. are for illustrative purposes only, and that many other sizes and shapes of the multi-layered grease pod for ball and fifth wheel hitches 100, 500 are well within the scope of the present disclosure. Although the dimensions of the multi-layered grease pod for ball and fifth wheel hitches 100, 500 are important design parameters for user convenience, the multi-layered grease pod for ball and fifth wheel hitches 100, 500 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A ball hitch grease pod comprising:
a multi-layered body having an outer layer and an inner layer;
a pressure sensitive enclosure; and
a grease supply;
wherein said grease supply enclosed between said outer layer and said inner layer;
wherein said inner layer having a first film;
wherein said outer layer having a second film;
wherein said outer layer is heat-sealed to said inner layer along a first edge and a second edge to form said pressure sensitive enclosure; wherein said first film dissolvable upon contact with moisture; wherein said multi-layered body is cup-shaped to fit snugly over a ball hitch; and
further wherein said multi-layered body burstable upon contact with a trailer coupler for distributing said grease supply to the ball hitch.

2. The ball hitch grease pod of claim 1, wherein said first film is a polyvinyl alcohol (PVA).

3. The ball hitch grease pod of claim 2, wherein said first layer having a thickness from 1 mm to 3 mm.

4. The ball hitch grease pod of claim 3, wherein said second layer having a thickness from 1 mm to 3 mm.

5. The ball hitch grease pod of claim 4, wherein said grease supply having a volume from 5 grams of grease to 50 grams of grease.

6. The ball hitch grease pod of claim 5, wherein said grease supply is selected from the group consisting of a marine grease, a lithium, and a graphite powder.

7. A ball hitch grease pod comprising:
a multi-layered body having an outer layer and an inner layer;
a pressure sensitive enclosure; and
a grease supply;
wherein said grease supply enclosed between said outer layer and said inner layer;
wherein said outer layer is heat-sealed to said inner layer along a first edge and a second edge to form said pressure sensitive enclosure; wherein said inner layer having a first water-soluble film, and further wherein said outer layer having a second water-soluble film; wherein said multi-layered body is cup-shaped to fit snugly over a ball hitch; and
further wherein said multi-layered body burstable upon contact with a trailer coupler for distributing said grease supply to the ball hitch.

8. The ball hitch grease of claim 7, wherein said first water-soluble film dissolvable upon contact with moisture.

9. The ball hitch grease pod of claim 8, wherein said first water-soluble film is a polyvinyl alcohol (PVA).

10. The ball hitch grease pod of claim 7, wherein said grease supply having a volume from 5 grams of grease to 50 grams of grease.

11. The ball hitch grease pod of claim 10, wherein said grease supply is selected from the group consisting of a marine grease, a lithium, and a graphite powder.

12. A method of greasing a ball hitch, the method comprising the steps of:
providing a grease pod having a multi-layered body including an outer layer and an inner layer, a pressure sensitive enclosure, and a grease supply, wherein said grease supply enclosed between said outer layer and said inner layer, wherein said outer layer is heat-sealed to said inner layer along a first edge and a second edge to form said pressure sensitive enclosure, wherein said inner layer having a first water-soluble film, and further wherein said outer layer having a second water-soluble film, wherein said multi-layered body is cup-shaped to fit snugly over the ball hitch
placing said grease pod on the ball hitch; and
bursting said grease pod upon contact with a trailer coupler for distributing said grease supply to the ball hitch.

13. The ball hitch grease pod of claim 12, wherein said grease supply having a volume from 5 grams of grease to 50 grams of grease, and further wherein said grease supply is selected from the group consisting of a marine grease, a lithium, and a graphite powder.

* * * * *